United States Patent
Ajdari et al.

(10) Patent No.: US 12,478,801 B2
(45) Date of Patent: Nov. 25, 2025

(54) SYSTEMS AND METHODS TO SUPPORT PERSONALIZATION OF CANCER TREATMENT FOR PATIENTS UNDERGOING RADIATION THERAPY

(71) Applicants: Elekta, Inc., Atlanta, GA (US); The General Hospital Corporation, Boston, MA (US)

(72) Inventors: Ali Ajdari, Boston, MA (US); Thomas Reinhard Bortfeld, Cambridge, MA (US); Maria Luiza Bondar, Waalre (NL); Matthieu Frédéric Bal, Geldrop (NL)

(73) Assignees: Elekta, Inc., Atlanta, GA (US); The General Hospital Corporation, Boston, MA (US)

( * ) Notice: Subject to any disclaimer, the term of this patent is extended or adjusted under 35 U.S.C. 154(b) by 1046 days.

(21) Appl. No.: 17/610,903

(22) PCT Filed: May 13, 2020

(86) PCT No.: PCT/EP2020/063316
§ 371 (c)(1),
(2) Date: Nov. 12, 2021

(87) PCT Pub. No.: WO2020/229532
PCT Pub. Date: Nov. 19, 2020

(65) Prior Publication Data
US 2022/0212034 A1  Jul. 7, 2022

Related U.S. Application Data

(60) Provisional application No. 62/847,371, filed on May 14, 2019.

(51) Int. Cl.
*A61N 5/10* (2006.01)
*G06N 7/01* (2023.01)
(Continued)

(52) U.S. Cl.
CPC ........... *A61N 5/1031* (2013.01); *G16H 20/40* (2018.01); *G16H 50/30* (2018.01)

(58) Field of Classification Search
CPC ...... A61N 5/1031; G16H 20/40; G16H 50/30; G06N 7/01; G06N 20/00
See application file for complete search history.

(56) References Cited

U.S. PATENT DOCUMENTS

2009/0234627 A1  9/2009  Yu
2009/0264728 A1  10/2009  Fischer
(Continued)

FOREIGN PATENT DOCUMENTS

EP  3384959 A1  10/2018
JP  2005107747 A  4/2005
(Continued)

OTHER PUBLICATIONS

International Search report and written opinion of PCT/EP2020/063316, dated Jun. 26, 2020.
(Continued)

*Primary Examiner* — Carrie R Dorna
*Assistant Examiner* — Joshua Daryl D Lannu
(74) *Attorney, Agent, or Firm* — Schwegman Lundberg & Woessner, P.A.

(57) ABSTRACT

In providing radiation therapy (RT) support, a patient specific toxicity risk is estimated for a RT side effect using a Bayesian network that receives as inputs values of biomarkers of the patient. A patient-specific RT plan is optimized with respect to parameters including the patient-specific toxicity risk. During delivery of RT according to the plan, at least one updated value is received for the biomarkers of the patient, and an updated patient-specific toxicity risk is estimated using the Bayesian network with the updated value(s). The Bayesian network biomarker nodes and a (Continued)

toxicity risk node representing the patient specific toxicity risk, and directed arcs with arc weights representing strengths of interdependencies between the nodes connected by the directed arcs. A graphical user interface (GUI) is provided via which a clinician may interact with the Bayesian network. A test recommendation may be initiated or updated for scheduling of a patient test based on the updated patient-specific toxicity risk.

21 Claims, 9 Drawing Sheets

(51) Int. Cl.
   *G06N 20/00* (2019.01)
   *G16H 20/40* (2018.01)
   *G16H 50/30* (2018.01)

(56) References Cited

U.S. PATENT DOCUMENTS

| | | | |
|---|---|---|---|
| 2010/0057651 A1* | 3/2010 | Fung | G06N 7/01 706/54 |
| 2011/0106749 A1 | 5/2011 | Krishnan | |
| 2011/0289035 A1 | 11/2011 | Stojadinovic | |
| 2012/0004492 A1 | 1/2012 | Weibrecht | |
| 2017/0083682 A1 | 3/2017 | McNutt | |
| 2018/0169437 A1 | 6/2018 | Carpenter | |
| 2018/0372710 A1 | 12/2018 | Lyng | |

FOREIGN PATENT DOCUMENTS

| | | |
|---|---|---|
| JP | 2011000301 | 1/2011 |
| JP | 2012521792 | 9/2012 |
| JP | 2014531634 | 11/2014 |
| JP | 2016521141 | 7/2016 |
| JP | 2019532787 | 11/2019 |
| KR | 20180060968 A | 6/2018 |
| WO | 2013030707 | 3/2013 |
| WO | 2014144804 | 9/2014 |
| WO | 2018057763 | 3/2018 |
| WO | 2020229532 | 11/2020 |

OTHER PUBLICATIONS

Kierkels, R. G. J. et al., "Direct use of multivariable normal tissue complication probability models in treatment plan optimisation for individualised head and neck cancer radiotherapy produces clinically acceptable treatment plans," Radiotherapy and Oncology, vol. 112, No. 3, pp. 430-436, Sep. 2014.

I. El Naqa et al., "Dose response explorer: an integrated open-source tool for exploring and modelling radiotherapy dose-volume outcome relationships," Phys. Med. Biol., vol. 51, No. 22, pp. 5719-5735, Nov. 2006.

Luxton, G. et al "A new formula for normal tissue complication probability (NTCP) as a function of equivalent uniform dose (EUD)," Phys. Med. Biol., vol. 53, No. 1, pp. 23-36, Jan. 2008.

Li, Allen X. et al., "The use and QA of biologically related models for treatment planning: Short report of the TG-166 of the therapy physics committee of the AAPM: TG-166 report," Med. Phys., vol. 39, No. 3, pp. 1386-1409, Feb. 2012.

Blanchard, P. et al., "Toward a model-based patient selection strategy for proton therapy: External validation of photon-derived normal tissue complication probability models in a head and neck proton therapy cohort," Radiother. Oncol. J. Eur. Soc. Ther. Radiol. Oncol., vol. 121, No. 3, pp. 381-386, 2016.

Haslett, Kate et al., "Protocol for the isotoxic intensity modulated radiotherapy (IMRT) in stage III non-small cell lung cancer (NSCLC): a feasibility study," BMJ Open, vol. 6, No. 4, p. e010457, Apr. 2016.

Adjari, Ali et al "Towards Optimal Stopping in Radiation Therapy", Radiotherapy and Oncology, vol. 134, 2019, pp. 96-100.

"International Application Serial No. PCT EP2020 063316, International Preliminary Report on Patentability mailed Nov. 25, 2021", 9 pgs.

"CN Patent Application No. 2021-568378 Notification of Reason for Refusal mailed Aug. 1, 2024", with English translation, 4 pages.

"CN Patent Application No. 2021-568378 Notification of Reason for Refusal mailed Dec. 7, 2023", with English translation, 10 pages.

"European Application No. 20726671.9, Examination Report dated Jan. 3, 2025", (Jan. 3, 2025), 4 pgs.

"Japanese Application No. 2021-568378, Office Action dated Mar. 13, 2025", w English Translation, (Mar. 13, 2025), 4 pgs.

"Chinese Application Serial No. 202080050809.9, Office Action dated Apr. 1, 2025", w English Translation, (Apr. 1, 2025), 12 pgs.

* cited by examiner

Recommendations

Triggers for recommendations

Pneumonitis (grade 3+)
Risk = 0.6 (low confidence)

| Action list & recommendations | Reasons |
|---|---|
| Acquire FDG-PET scan after fraction 20. | Update value of risk for pneumonitis and increase confidence of prediction. |
| Assess accumulated dose to OARs and the projected total dose. Consult alternative fractionation schemes. | Treatment adaptation might decrease the mean lung dose and the risk for pneumonitis. |
| Reduce other treatment components associated with high risk for radiation pneumonitis. | Evidence from clinical trial XXXXX shows that component Y increases the risk for radiation pneumonitis. |

*Fig. 8*

| Patient data associated to risk of pneumonitis |
|---|
| Age, smoking history, comorbidities, lung function, blood biomarkers, PET/SUV value, mean lung dose |
| Predicted risk for pneumonitis based on available data is 0.6 (low confidence) |
| Biomarkers to be acquired at fraction 20 to confirm / update the value of risk for pneumonitis: PET/SUV |

Fig. 9

SYSTEMS AND METHODS TO SUPPORT PERSONALIZATION OF CANCER TREATMENT FOR PATIENTS UNDERGOING RADIATION THERAPY

CROSS-REFERENCE TO PRIOR APPLICATIONS

This application is the U.S. National Phase application under 35 U.S.C. § 371 of International Application No. PCT/EP2020/063316, filed on May 13, 2020, which claims the benefit of U.S. Provisional Patent Application No. 62/847,371, filed on May 14, 2019. These applications are hereby incorporated by reference herein.

FIELD

The following relates generally to the clinical arts, the radiation therapy arts, radiation therapy planning arts, and related arts.

BACKGROUND

In radiation therapy (RT), the probability to sterilize the tumor increases with increase in radiation dose delivered to the tumor by RT. However, the RT also delivers dose to nearby normal tissue, and this can cause undesirable side effects. Typically, the maximum dose prescribed to the tumor is determined by clinical trials that aim to establish a trade-off between survival and normal tissue complications in a group of patients. The resulting prescription dose and normal tissue dose-limiting constraints are then applied to all similarly situated oncology patients, usually with limited regard to inter-patient variability. In practice, however, significant inter-patient variability in side effects is observed after radiotherapy. Some approaches for personalizing the RT treatment planning have been employed. For example, in isotoxic RT, patients receive a maximal achievable biological effective dose (BED) to the tumor while respecting the normal tissue constraints and their individual tumor size and location. The normal tissue constraints are based on historical population data.

Normal tissue complication probability (NTCP) models are commonly used during RT planning to estimate likelihood of various possible complications. These models usually take as input dosimetric parameters, and assume a certain type of dose-volume effect for a region of interest (ROI). NTCP models can be used to evaluate and optimize a treatment plan.

In order to train an NTCP model, the grade and the type of the side effect is collected from a population of RT patients at a specific point in time after the completion of the treatment course e.g., grade 3 and larger than 3 (grade 3+) xerostomia after 6 months, or 12 months, grade 2+ radiation induced pneumonitis at 12 months. A parametric NTCP model relating the dose to the side effect is then generated by fitting the model's parameters to the population data.

Generally, an NTCP model for RT applications is modeled as a sigmoid dose-response curve. An example of an NTCP model is the Lyman-Kutcher-Burman (LKB) model, which is described by way of illustration, and is given by:

$$NTCP = \frac{1}{\sqrt{2\pi}} \int_{-\infty}^{u} e^{-\frac{t^2}{2}} dt \quad (1)$$

where:

$$u = \frac{EUD - TD_{50}}{m \cdot TD_{50}} \quad (2)$$

and:

$$EUD = \left(\sum_{j=1}^{n} v_j d_j^a\right)^{\frac{1}{a}} \quad (3)$$

In Equations (1)-(3), the parameters are as follows: "EUD" denotes equivalent uniform dose; n is the number of sub-volume units (e.g. voxels) in the organ at risk (OAR); is $v_j$ is the $j^{th}$ fractional sub-volume with total absorbed dose $d_j$, $TD_{50}$ is the uniform dose for the whole organ for which NTCP is 50% (sometimes referred to as the median toxic dose), m is a dimensionless parameter to control the slope of the dose response curve, and the parameter a describes the tissue specific dose-volume dependence. Note that Equations (1)-(3) only capture the NTCP for a delivered dose $\Sigma_{t=1}^{N} d_j^t$ to each fractional sub-volume j that are equally dispersed over the course of N fractions and are indexed by t. To capture the effect of different fractionation schemes (i.e., different number of fractions and/or dose per fraction), a generalized version of the EUD can be derived as follows, based on the linear-quadratic (LQ) dose-response model:

$$EUBED = \left(\sum_{j=1}^{n} v_j (BED(d_j))^a\right)^{\frac{1}{a}} \quad (4)$$

in which $$BED(d_i) = \sum_{t=1}^{N} d_j^t \left(1 + \frac{d_j^t}{(\alpha/\beta)N_{conv}}\right),$$

where $\alpha/\beta$ and $N_{conv}$ are the tissue-specific fractionation sensitivity parameter and the conventional number of fractions, respectively. Consequently, fractionation-corrected NTCP can be calculated by using Equation (1) and replacing EUD in Equations (2) and (3) with EUBED in Equation (4).

The non-uniform three-dimensional (3D) dose distribution to the OAR is typically included in an NTCP model by using a single one-dimensional (1D) dose variable D or a combination of several 1D dose variables. For example, the dose variable D can be modelled by the equivalent uniform dose (EUD) as in Equation (3), or by the generalized equivalent uniform dose (gEUD), the mean dose to the OAR, the median dose, the volume receiving higher than a dose value (e.g., a dose-volume histogram or DHV), or by the weights of the DVH in a lower dimensional space (e.g., found with principal component analysis). In clinical practice, the treatment plan can be optimized such that the probability to develop a complication in a population of patients is below a threshold. For example, given an LKB-NTCP model for which the parameters are fitted with population data, it is possible to create a table of EUD values corresponding to different levels of complication probability. In this way, an optimization constraint for radiotherapy planning on the normal complication probability risk can be achieved indirectly by constraining the EUD.

The value of $TD_{50}$ for a particular side effect is first determined, and then the LKB-NTCP model of Equations (1)-(3) (or some other type of NTCP model) can be applied. $TD_{50}$ for the side effect is usually estimated based on historical population data for a cohort of patients similar to the patient-under-treatment. Conventional NTCP models only use dose from current patient to estimate a probability, only using other data as criteria for the model (fractionation scheme, . . . ). The following discloses approaches for using additional data to make the prediction more accurate and for using the model to guide the clinician in treatment monitoring.

The following discloses certain improvements.

SUMMARY

In some non-limiting illustrative embodiments disclosed herein, an apparatus is disclosed for supporting delivery of radiation therapy (RT) to a patient. The apparatus comprises an electronic processor and a non-transitory storage medium storing instructions readable and executable by the electronic processor to perform a RT support method. The RT support method includes: estimating a patient specific toxicity risk for a RT side effect using a Bayesian network that receives as inputs values of biomarkers of the patient; receiving at least one updated value for the biomarkers of the patient; and estimating an updated patient-specific toxicity risk using the Bayesian network receiving as input the at least one updated value. In some embodiments, the Bayesian network has nodes including biomarker nodes representing values of the biomarkers of the patient and a toxicity risk node representing the patient specific toxicity risk, and the Bayesian network further includes directed arcs wherein each directed arc connects a first node consisting of a biomarker node to a second node consisting of a biomarker node or the toxicity risk node. The directed arcs have arc weights representing strengths of interdependencies between the nodes connected by the directed arcs.

In some non-limiting illustrative embodiments disclosed herein, a non-transitory storage medium stores instructions readable and executable by an electronic processor to perform a RT support method for supporting delivery of RT to a patient in accordance with a fractionated RT plan. The RT support method comprises: estimating an initial patient specific toxicity risk for a RT side effect using a Bayesian network having nodes representing biomarkers of the patient and the patient specific toxicity risk and further having directed arcs extending between pairs of the nodes wherein the directed arcs have arc weights; converting the initial patient-specific toxicity risk to initial normal tissue complication probability (NTCP) values for fractions of the fractionated RT plan using a NTCP model; receiving at least one updated value of at least one of the biomarkers of the patient represented by the nodes of the Bayesian network; estimating an updated patient-specific toxicity risk using the Bayesian network with the at least one updated value; and converting the updated patient-specific toxicity risk to updated NTCP values for the fractions of the fractionated RT plan that have not yet been performed at a time of the receiving of the at least one updated value.

In some non-limiting illustrative embodiments disclosed herein, a RT support method for supporting delivery of RT to a patient in accordance with a patient-specific RT plan includes, by an electronic processor, estimating a patient specific toxicity risk for a RT side effect using a Bayesian network, and displaying, on a display, a rendering of the Bayesian network. In some embodiments, the Bayesian network has nodes including biomarker nodes representing values of biomarkers of the patient and a toxicity risk node representing the patient specific toxicity risk, and the Bayesian network further includes directed arcs. Each directed arc connects a first node consisting of a biomarker node to a second node consisting of a biomarker node or the toxicity risk node. Each directed arc has an arc weight representing a strength of interdependence of the second node on the first node.

One advantage resides in providing risk assessments for various deleterious side effects of radiation therapy that are tuned to the specific patient.

Another advantage resides in providing such risk assessments that are automatically adjusted over the course of the radiation therapy to account for updated biomarker information about the patient.

Another advantage resides in providing such risk assessments in conjunction with a graphical user interface (GUI) that presents the information in an intuitive fashion.

Another advantage resides in providing such risk assessments using a Bayesian network-based model whose nodes and connections are readily understood by a clinician in terms of underlying clinical data and biologically meaningful relationships.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIGS. 5-9 diagrammatically illustrate some information renderings that may be suitably presented by the GUI of the apparatus of FIG. 1.

DETAILED DESCRIPTION

Figure 1:
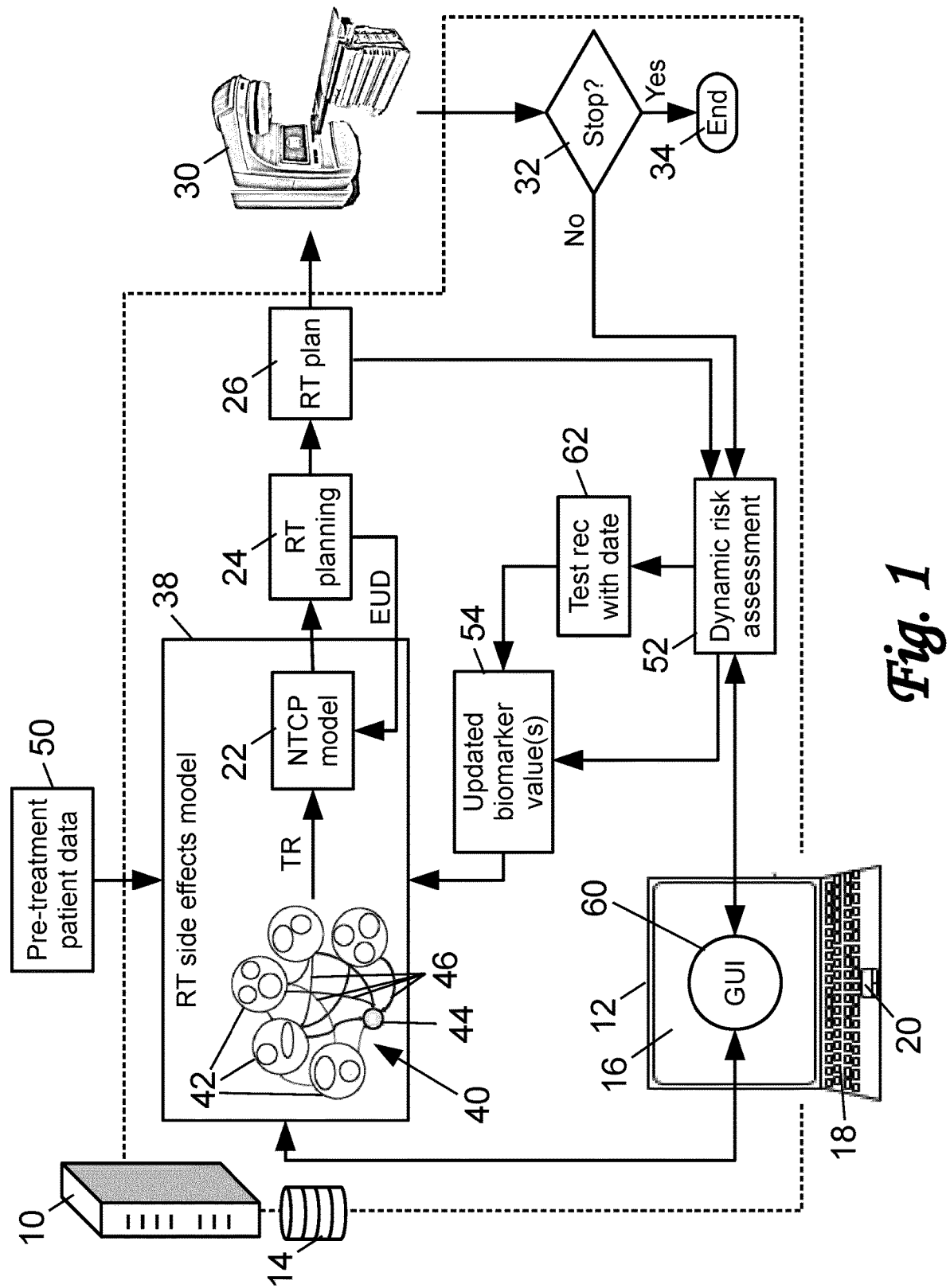
FIG. 1 diagrammatically illustrates an apparatus for supporting delivery of radiation therapy (RT) to a patient.

While radiation therapy planning tools provide substantial information for initial planning of the radiation therapy treatment, existing tools provide substantially less guidance to clinicians as the radiation therapy progresses. Disclosed herein are tools to provide clinicians with information about changes in a specific patient's situation as the radiation therapy progresses, and to provide an intuitive user-interactive tool by which a clinician can explore options for assessing and adjusting the radiation therapy in an ongoing fashion. Embodiments disclosed herein provide methods and apparatuses implementing a graphical user interface to support the clinician in identifying patient information for making clinical decisions during the course of the radiation therapy regimen, and for updating the radiotherapy plan.

Approaches disclosed herein employ Bayesian network (BN) models for the NTCP, which as recognized herein have advantages compared with other machine learning (ML) techniques with respect to transparency (e.g., ease of interpretation of the NTCP modeling in terms of clinical inputs) and temporal modeling, as well as the ability to be implemented in a graphical user interactive manner conducive to implementation as a graphical user interface (GUI). Bayesian network results are relatively easy to visualize to the user, giving insights on what influences a certain prediction outcome. Optionally, alternative more complex approaches can be used to improve the prediction accuracy. Combining with a graphical (Bayesian network based) representation to the user allows to still provide those insights and provide the advantages of Bayesian network and more complex machine learning (ML) approaches.

A Bayesian network is a probabilistic graphical model that uses graph theory and Bayesian inference to represent the conditional inter-dependence between a set of variables, via a directed acyclic graph. Each variable in the model is represented as a node in the graph, and the relationship (inter-dependence) between any two nodes is denoted by an arc connecting the nodes. A link between the graph theory and probabilistic models channeled through Bayesian theory is the absence or presence of variable independence. In a Bayesian network, each conditional dependence between variables is shown by an arc connecting the given nodes (denoting the variables). The absence of an arc between two nodes indicates conditional independence of variables represented by those nodes from each other. Furthermore, the dependence between variables connected by an arc can represent negative or positive correlation (shown in the direction of the arc). If, in a given graph G, an arc a connects node A to node B (in that direction), then it means that (i) variable A and B are dependent, (ii) the value of A (partially) determines the value of the variable B (hence the direction from A to B, and (iii) the weight of the arc a denotes the (relative) correlation between these variables (that is, the strength of interdependence between the nodes). Conversely, if there is no arc connecting two variables C and D, it means that the two variables are conditionally independent.

Bayesian networks leverage graph theory and Bayesian inference to model the inter-relationships between all nodes in the model, and to arrive at the best fit for the joint probability distribution over the entire network. Bayesian networks do this in two distinct but inter-connected steps: structure learning, which aims at finding the structure of the network in terms of the arrangement of the arcs and the node; and parameter learning, which estimates the relative weight of each arc in the "learned" network. Various optimization algorithms can be used to train the Bayesian network structure, such as constraint-based and score-based structure learning.

Most Machine learning (ML) algorithms, including deep learning and neural networks have a lack of transparency. The neural network typically has an input layer, an output layer, and a (potentially large) number of hidden layers connecting the input and output layers. These hidden layers do not have readily discernable meaning in a clinical context. There is no straightforward way to interpret the fitted parameters (e.g. weights and activation function parameters) of the hidden layers of the neural network in clinical terms. It is not apparent why a trained neural network arrives at its output. This opacity of the neural network creates difficulties in the clinical sphere. For example, it is difficult or impossible for a clinician to articulate a clinical case for a medical therapy that is premised on an output provided by a neural network. By way of one illustrative example, a trained neural network may predict a certain toxicity risk (e.g., represented as a toxicity probability) for a specific side effect—but the clinician has no way of articulating why this is so, or what adjustments might be made to the radiation treatment plan so as to allow for more aggressive radiation therapy treatment of the tumor.

By contrast, Bayesian networks are more transparent, as they comprise nodes representing defined clinical inputs and arcs connecting the nodes which express interrelationships between these clinical inputs. The opacity of the hidden layers of a neural network have no analog in the Bayesian network. The weight of an arc connecting two nodes is readily interpretable as a measure of interrelatedness of the clinical inputs represented by the connected nodes. Hence, the structure of a Bayesian network can be articulated in clinical terms, and it is apparent why the trained Bayesian network arrived at a certain output. If this output is questioned, the processing can be traced and verified.

A further advantage of Bayesian networks is that they can be trained using less data than a typical neural network. Quality data for training NTCP models is sometimes limited. Advantageously, Bayesian networks by the nature of their setup and architecture can be trained on lesser amounts of data compared with other machine learning methods in most cases. This is a consequence of the lack in a Bayesian network of the (often many) hidden layers of a neural network.

Bayesian networks also exhibit beneficial temporal characteristics. The availability and frequency of information update over the course of fractionated radiation therapy differs markedly for different biomarkers. For example, blood-based biomarkers can be obtained in weekly blood samples, whereas functional imaging biomarkers are acquired much less frequently (indeed, often only once during the course of the fractionated radiation therapy). As such, information is made available to the NTCP model in a gradual manner. Machine learning (ML) algorithms are typically designed to process an entire complete data set in a single run of the ML algorithm, and adding a new biomarker to an ML-based NTCP model would typically entail reconfiguring and retraining the ML model from scratch. By contrast, Bayesian learning (which is the building block of the Bayesian network) is well suited for updating the NTCP model in a gradual fashion as information becomes available. As recognized herein, this type of gradual updating of Bayesian network NTCP modeling also readily incorporates user interactivity via a GUI interface. For example, the Bayesian network modeling the NTCP for a particular side effect may initially be trained without (for example) the node representing the mid-treatment functional imaging biomarker(s). Once these become available, the user can add a node representing the mid-treatment imaging via a GUI and the Bayesian network weights are adjusted by an update training operation (which is typically fast as the weights are already approximately known for all arcs except those connecting with the newly added mid-treatment imaging node).

Interactivity is a benefit of Bayesian network modeling in a more general sense. Unlike a neural network or other types of ML, a Bayesian network can be set up in an interactive fashion, dynamically receiving input from the user (even after the model has been built and trained), and adjusting the network accordingly. This feature makes Bayesian networks particularly useful as a decision-aiding toolbox to be used routinely at clinics. For example, a clinician, based on their experience and expertise, may believe that a particular relationship should or should not exist between two or more nodes of the network. In an interactive Bayesian network, the clinician may input this belief by providing whitelist or blacklist of different arcs in the Bayesian network, or may add or remove arcs in the Bayesian network as they see fit. This is not practical in a neural network or other ML models due to their typically complex structures, with (typically many) hidden layers.

The disclosed approaches provide advantages in the use of patient-specific data acquired before or during the course of the radiation treatment to assess the risk of a side effect for a patient. For the clinician, it may be difficult to understand which specific data is the most relevant to predict the risk of a side effect and the causal relationship between the available data. Moreover, during the course of radiation treatment, additional data becomes available, such as new imaging data, blood measurements, or so forth. Depending on the treatment protocol, specific biomarkers measured during the course of the treatment might be predictive of a side effect. For the clinician, it is difficult to understand which data measurement is required at a specific point in time in order to update the risk of developing a side effect or make an informed assessment of the benefit of acquiring additional data to improve the treatment monitoring accuracy. The disclosed approaches provide a GUI interface, based on Bayesian network modeling of risk of various side effects, to provide information on the risks and causal relationships. Additionally, the integration of an updated risk for side-effects is incorporated in the planning optimization workflow. The risk for side effect might be predicted using prediction models and methodologies, other than the ones implemented in the treatment planning system that the clinician is currently using for plan optimization. For the RT clinician it is difficult to understand and implement different types of models and update a treatment plan based on an updated risk for a side effect. The Bayesian network formalism readily provides such updating, and the GUI presents the updated information to the clinician in an intuitive manner.

With reference to FIG. 1, an apparatus for supporting delivery of radiation therapy (RT) to a patient includes an electronic processor 10, 12 and a non-transitory storage medium 14 storing instructions readable and executable by the electronic processor 10, 12 to perform a RT support method as disclosed herein. The illustrative electronic processor 10, 12 includes a server computer 10 and an illustrative user interfacing computer 12, the latter including a display 16 and illustrative user input devices including a keyboard 18 and a trackpad 20. More generally, there may be any number of user interfacing computers of various form factors (e.g. notebook computers, desktop computers, tablet computers, dumb terminals, and/or so forth) and with various user input devices (e.g. the display 16 may be a touch sensitive display serving as a user input device, and/or the trackpad 20 could be augmented with or replaced by a mouse, trackball, or other pointing device, a microphone-based voice recognition user input device could be added or substituted, and/or so forth). The illustrative server computer 10 could be a single server computer, a cluster of two or more server computers, a cloud computing resource, and/or so forth, and typically has higher data processing capacity compared with the user interfacing computer(s) 12 and hence is employed for performing computationally complex tasks such as implementing the Bayesian network. On the other hand, if the user interfacing computer 12 has sufficient processing power then the server computer may be omitted entirely with the user interfacing computer 12 being programmed to perform all data processing.

The non-transitory storage medium 14 may be any suitable computer-readable storage medium or combination of media, such as (by way of non-limiting illustrative example) a hard disk drive or other magnetic storage medium, a solid state drive (SSD) or other electronic storage medium, an optical disk or other optical storage medium, various combinations thereof, and/or so forth. The non-transitory storage medium 14 may be accessed via an electronic network possibly including the Internet, and/or may be a complex storage system such as a Redundant Array of Independent (or Inexpensive) Disks (RAID) data storage.

The electronic processor 10, 12 implements radiation therapy (RT) planning, using a normal tissue complication probability (NTCP) model 22. This NTCP model 22 may, for example, be the Lyman-Kutcher-Burman LKB-NTCP model described in the background with reference to Equations (1)-(3), although any other normal tissue complication probability model that outputs a probability of a RT side effect can be used. It should also be noted that while the illustrative example refers to a single NTCP model, typically there will be separate NTCP models for each RT side effect of concern to clinicians for the particular RT being administered to the patient; only one such NTCP is discussed herein by way of illustrative example.

The NTCP model 22 has a toxic dose parameter. The illustrative examples employ the median toxic dose, $TD_{50}$, as the toxic dose parameter, in conformance with the LKB-NTCP model illustrated in Equations (1)-(3). However, $TD_{50}$ can be replaced by some otherwise-defined toxic dose such as the half maximum effective concentration (EDO or the median lethal dose ($LD_{50}$), with appropriate adjustment of the NTCP formulation. Conventionally, the $TD_{50}$ value is determined by historical data on a cohort of past patients similarly situated to the present patient undergoing RT, with no adjustment beyond the cohort definition being made for patient-specific characteristics, and no adjustment of the toxic dose over the course of the RT to reflect changes in the patient. This conventional approach is improved upon in embodiments disclosed herein by providing a patient specific toxic dose that may be updated to reflect changes in the patient.

The NTCP model 22 is also dependent upon the "effective" radiation dose delivered to the volume of interest, such as an organ at risk (OAR) for which a RT side effect is being analyzed. In the LKB-NTCP model of illustrative Equations (1)-(3), this effective radiation dose is represented by the equivalent uniform dose (EUD), which is calculated using Equation (3) for a fractionated RT plan with N fractions (where N is an integer greater than one). As also noted previously, this is merely an illustrative example, and the effective radiation dose formulations may be used in the NTCP model 22, such as a generalized equivalent uniform dose (gEUD), mean dose to the OAR, or so forth. It will be appreciated from Equations (1)-(3) that in order to compute the NTCP value for the RT plan, the plan must be known so as to compute the effective radiation dose input (e.g. the EUD value for input to Equation (2) which in turn feeds into Equation (1)). Hence, as diagrammatically depicted in FIG. 1, a RT planning process 24 generates a RT plan which permits computing the EUD (or more generally, the effective radiation dose) which is fed back to the NTCP model 22 to assess the RT plan in terms of the NTCP value computed for the RT plan. The RT planning process 24 may be implemented by a commercial RT planning system such as the Pinnacle³ Treatment Planning System available from Koninklijke Philips N.V. (Eindhoven, the Netherlands). Based on iterative updating the RT plan via the RT planning process 24 and assessment of the plan using the NTCP values for the RT side effects of concern as well as other metrics such as a commonly used Tumor Control Probability (TCP), a final RT plan 26 is obtained which meets the clinical objectives to the satisfaction of the deciding clinician(s). The RT plan 26 is patient specific since it is designed for the patient's specific anatomy as captured by computed tomography (CT), magnetic resonance (MR), and/or other-modality planning images which are used in the RT planning 24. (In improved embodiments disclosed herein, patient specificity of the RT plan 26 is further due to use of a patient-specific toxic dose (e.g. $TD_{50}$) in the NTCP model 22. Typically, the RT plan 26 is a fractionated RT plan having N fractions (where N is an integer greater than one).

The resulting RT plan 26 is executed by a suitable radiation therapy (RT) delivery device 30, which in illustrative FIG. 1 is a linear accelerator (linac) 30, although other types of RT delivery devices may be used. Each fraction $j=1, \ldots, N$ of the RT plan 26 is typically performed by the RT delivery device 30 on a separate calendar date (or calendar date range), these dates usually being scheduled in advance with successive fractions being on successive days (possibly with one or more days in-between to provide for patient recovery as is known in the oncology arts). After each fraction, a stopping criterion 32 may be applied to determine whether to continue with the RT regimen of the patient. The stopping criterion is usually at least based on fraction number—that is, the RT regimen typically continues until the last fraction N is carried out. However, the stopping criterion 32 may employ other factors, such as follow-up medical imaging by CT, MR positron emission tomography (PET), or so forth to assess efficacy of the RT regimen in terms such as tumor size reduction, with the stopping criterion 32 possibly including an early termination of the RT regimen (i.e., "early" being before reaching the last fraction N) if the follow-up imaging indicates the therapy is ineffective. Another possible factor in the stopping criterion 32 may be side effects, e.g. if the patient incurs a certain deleterious RT side effect then the RT regimen may be terminated early. When the stopping criterion 32 is met (either by completing the last fraction N or due to some other factor), then the RT regimen ends as diagrammatically indicated at 34.

As previously noted, the toxic dose (e.g. $TD_{50}$) is conventionally determined by historical data on a cohort of past patients, without taking into account patient-specific characteristics, and with no adjustment of the toxic dose over the course of the RT to reflect changes in the patient.

Figure 2:
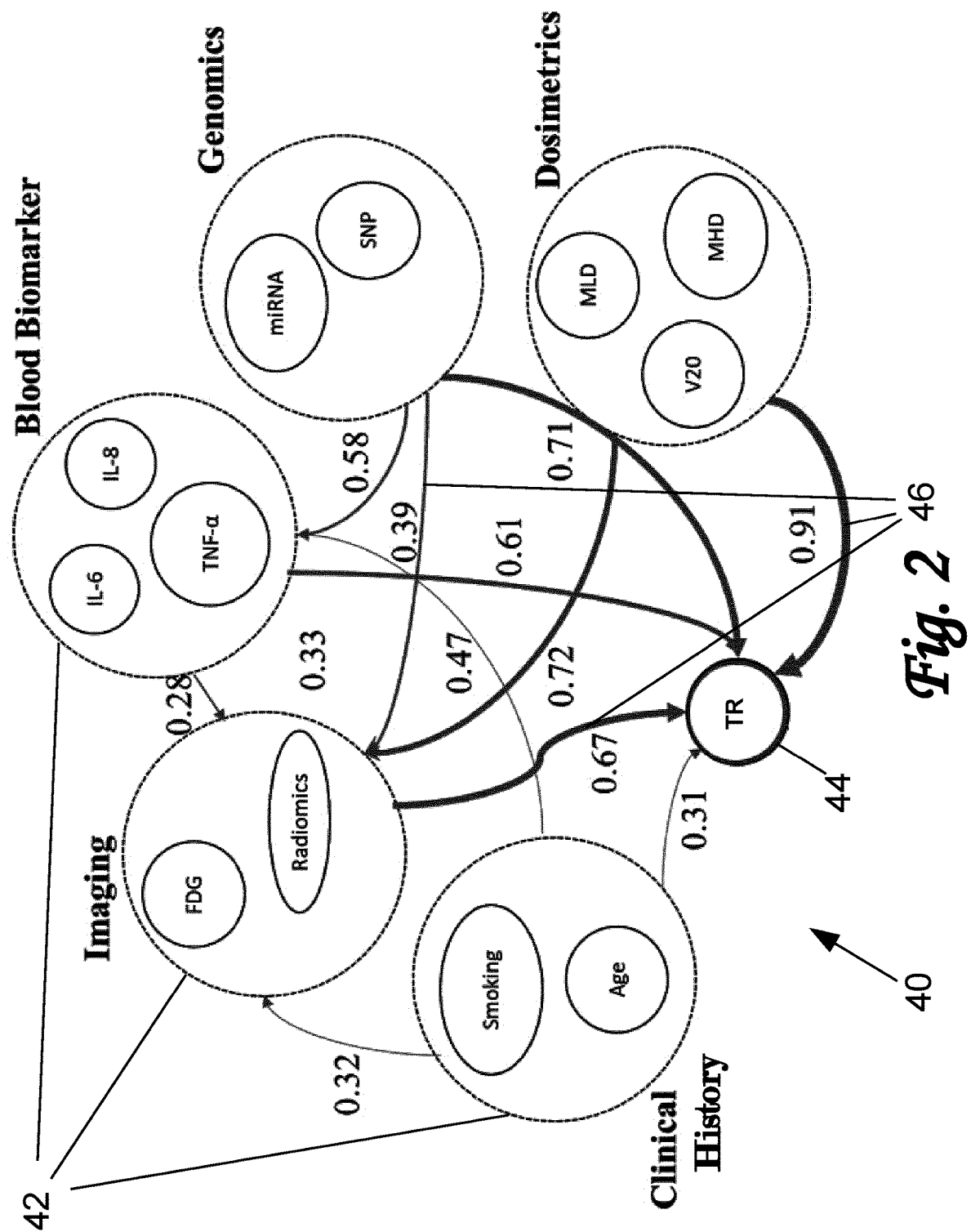
FIG. 2 diagrammatically illustrates a rendering of a Bayesian network toxicity risk model suitably used by the apparatus of FIG. 1 to predict a patient-specific toxicity risk.

With continuing reference to FIG. 1 and with further reference to FIG. 2, this conventional approach is improved upon in embodiments disclosed herein by providing RT side effects modeling 38 which includes the NTCP model 22 operating in conjunction with a patient-specific toxicity risk model 40 to determine the toxic dose (e.g. $TD_{50}$). The toxicity risk model 40 estimates the patient-specific toxicity risk for a RT side effect. The patient-specific toxicity risk model 40 is implemented as a Bayesian network 40, an illustrative example of which is indicated diagrammatically in FIG. 1 and is shown in further detail in FIG. 2. The Bayesian network 40 has nodes 42, 44 including biomarker nodes 42 representing values of biomarkers of the patient and a toxicity risk node 44 representing the patient-specific toxicity risk. The Bayesian network 40 further including directed arcs 46. Each directed arc connects a first node consisting of a biomarker node 42 to a second node consisting of a biomarker node 42 or the toxicity risk node 44. As shown in FIG. 2, each arc has an arc weight representing dependence of the second node on the first node. The illustrative Bayesian network RT side effects model 40 of FIG. 2 includes five biomarker nodes 42: a biomarker node representing a value of at least one biomarker of the patient retrieved from a patient clinical history; a biomarker node representing a value of at least one imaging biomarker of the patient acquired by medical imaging of the patient; a biomarker node representing a value of at least one blood biomarker of the patient acquired by testing of blood of the patient; a biomarker node representing a value of at least one genomic biomarker of the patient acquired by genomic testing of the patient; and a biomarker node representing a value of at least one dosimetric biomarker of the patient indicating radiation dosage received by various anatomical regions of the patient. In the illustrative biomarkers of FIG. 2: FDG denotes one or more biomarkers obtained by PET imaging using a fludeoxyglucose radiopharmaceutical; V20 denotes the total lung volume receiving ≥20 Gy; MLD denotes the mean lung dose; MHD denotes the mean heart dose; and the remaining acronyms have their usual clinical meaning. It will be appreciated from the example of FIG. 2 that the term "biomarker" as used herein is broadly construed as including information such as patient demographic information (e.g. patient age), clinically relevant patient habits (e.g. smoker or nonsmoker), dosimetric values, and/or so forth. The biometrics shown in FIG. 2 are merely illustrative examples, and additional, fewer, and/or other biometrics may be employed in the Bayesian network toxicity risk model 40. It is further noted that, in order to capture dependencies between specific biomarkers more precisely, it is contemplated to divide one or more illustrative biomarker node into two or more nodes with different directed arcs with generally different weights. For example, the dosimetrics node could be divided into three separate nodes representing V20, MLD, and MHD respectively.

The Bayesian network toxicity risk model 40 is trained on historical patient data. The past patients used in training do not need to form a cohort "similarly situated" to the present patient, because the purpose of the training of the Bayesian network 40 is to tune the Bayesian network to provide a toxicity risk value that is tailored for a given patient based on the patient's values for the biomarkers represented by the biomarker nodes 42. Hence, the set of past patients providing the training data is preferably large and fairly diverse (although some selectivity to a cohort definition may be employed during the training phase, for example different Bayesian network toxicity risk models 40 may be trained for men versus women, or for different ethnicities, or so forth). The Bayesian network toxicity risk model 40 is trained for a particular RT side effect—to account for a number of different side effects, a different Bayesian network toxicity risk model 40 is trained for each specific side effect. The Bayesian network toxicity risk model 40 is trained to output the toxicity risk. The training phase is not depicted in FIG. 1, and is typically performed "offline" prior to deployment of the RT support apparatus providing the RT side effects modeling 38 for clinical patients. As previously mentioned, in some embodiments the training of the Bayesian network toxicity risk model 40 may be done in two connected steps: a structure learning step which aims at finding the structure of the network in terms of the arrangement of the arcs 46 and the nodes 42, 44; and a parameter learning step which estimate the weights of the directed arcs 46 in the "learned"

network. Such training may, for example, employ constraint-based and score-based structure learning. In some embodiments, the automated structure learning step is augmented or replaced by manual construction of the structure including defining the biomarker nodes 42 and selecting the directed arcs 46. Such manual construction leverages the transparent nature of Bayesian networks to enable a skilled clinician to select the biomarker nodes 42 based on knowledge about what types of biomarkers have been shown in clinical studies to impact the toxicity risk for the RT side effect under consideration. The manual construction may also include selecting the directed arcs 46 based on knowledge about what types of biomarkers have been shown in clinical studies to impact other types of biomarkers. Such manual construction may provide the final Bayesian network structure after which the parameter learning step commences, or may be followed by further automated structure learning to fine tune the structure. The training process can also be iterative—for example, the network structure may be initially laid out manually followed by the parameter learning step, and then the resulting arc weight examined. If a certain directed arc has a very low learned weight then this may suggest the arc could be removed and the parameter learning step repeated without the arc.

After the training phase, and as part of the initial RT planning process, pre-treatment patient data 50 are input to the RT side effects modeling 38 to provide patient-specific values for the various biomarkers represented by the biomarker nodes 42 of the (trained) Bayesian network toxicity risk model 40. The Bayesian network toxicity risk model 40 is then deployed to infer the toxicity risk (represented by the value of the toxicity risk node 44) from the input patient-specific values of the biomarkers represented by the biomarker nodes 42. This patient-specific toxic dose (e.g. $TD_{50}$) for the considered RT side effect can then be determined from the toxicity risk and the RT-specific NTCP model 22. The patient-specific toxic dose (e.g. $TD_{50}$) is used to update the RT-specific NTCP model. The updated RT-specific NTCP model is used in the RT planning 24 as previously described Additionally, the Bayesian network toxicity risk model 40 may be employed during the course of the fractionated radiation therapy (e.g., during intervals between successive fractions) in order to provide the clinician with updated information on the patient-specific risk of developing the RT side effect. As shown in FIG. 1, dynamic risk assessment 52 may be performed using the Bayesian network toxicity risk model 40. This entails receiving at least one updated value 54 of at least one of the biomarkers of the patient represented by the biomarker nodes 42, and estimating an updated patient-specific toxicity risk using the Bayesian network toxicity risk model 40 with the at least one updated value. In the illustrative embodiments, the dynamic risk assessment 52 further includes displaying, on the display 16 operatively connected with the electronic processor 10, 12, a graphical user interface (GUI) 60. The GUI 60 is shown diagrammatically in FIG. 1, and may include, for example, displaying a rendering of the Bayesian network 40 (e.g., similar or identical to the rendering shown in FIG. 2), displaying a plot of the updated NTCP model 22 as a function of dose (see FIG. 5), displaying a plot of NTCP value as a function of (at least) the remaining fraction(s) of the RT plan 26 (see FIG. 6), displaying a warning that the updated NTCP value at some fraction of the fractionated RT plan exceeds a threshold value indicating unacceptable risk of the RT side effect (see FIG. 7), and/or display of factors associated with the risk of the RT side effect and/or a test recommendation 62 for assessing the risk of the RT side effect (see FIGS. 1, 8, and 9).

Figure 3:
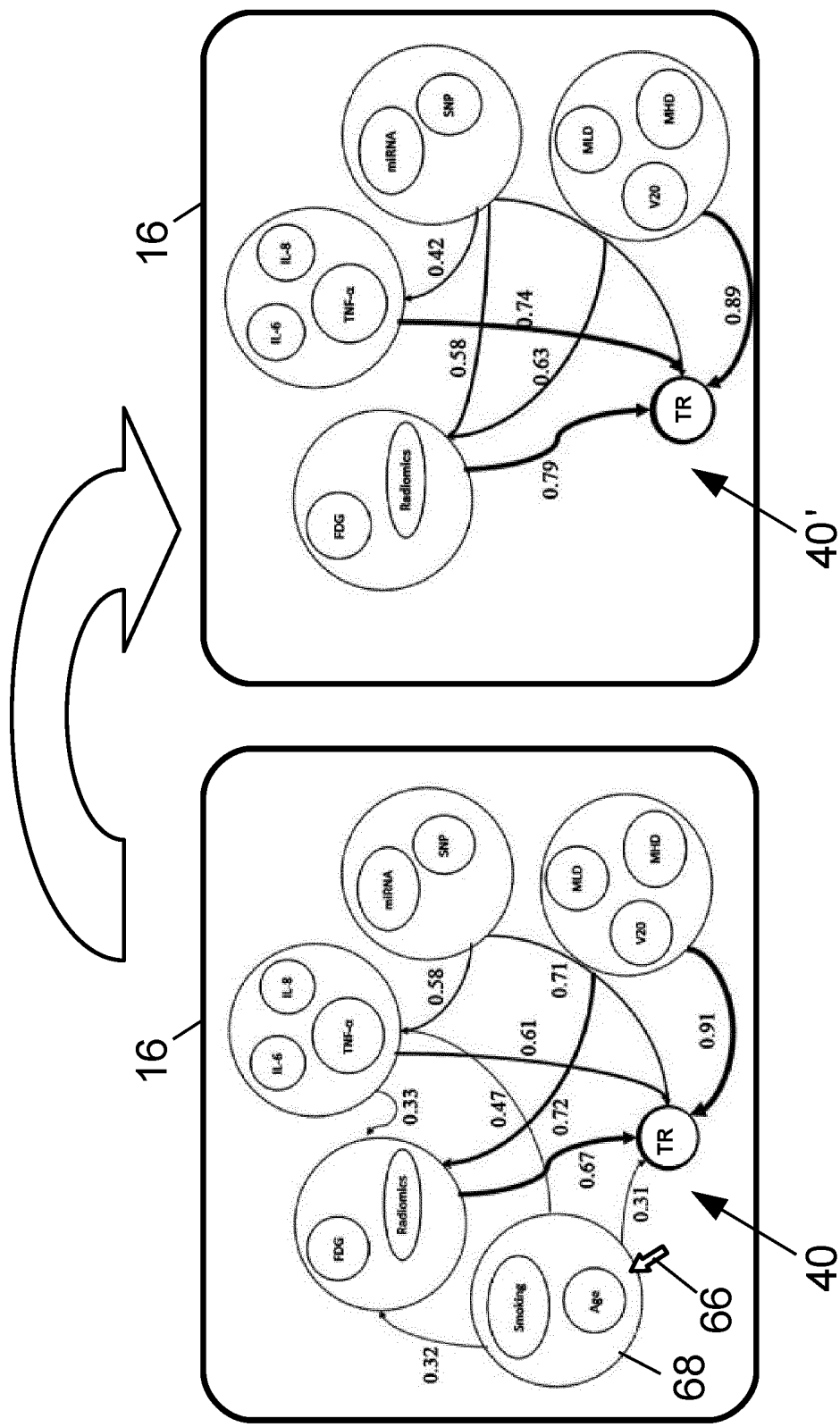
FIG. 3 diagrammatically illustrates user modification of the Bayesian network toxicity risk model of FIG. 2 via a graphical user interface (GUI) of the apparatus of FIG. 1.

With further reference to FIG. 3, in some embodiments the GUI 60 provides the user with the ability to edit the structure of the Bayesian network toxicity risk model 40. This entails receiving, via one or more of the user input devices 18, 20 interacting with the GUI 60, one or more structural modifications of the Bayesian network, and then estimating a user updated patient-specific toxicity risk using the Bayesian network with the received one or more structural modifications. The modifications may, for example, include one or more of: addition of a biomarker node 42, removal of a biomarker node 42, addition of a directed arc 46, and/or removal of a directed arc 46. In the GUI rendering on the display 16 shown on the left side of FIG. 3, a mouse pointer 66 is controlled by the user operating the trackpad 20 (shown in FIG. 1) to select a biomarker node 68 for removal. In the subsequent GUI rendering on the display 16 shown on the right side of FIG. 3, the original Bayesian network 40 is modified to become a modified Bayesian network 40' which has the biomarker node 68 removed, along with removal of all directed arcs connecting to or from the biomarker node 68. Additionally, the weights of the remaining directed arcs are re-optimized (note, this may be done offline during the training phase, i.e. variants of the Bayesian network with more or fewer nodes may be trained and stored in order to provide fast retrieval of the re-optimized weights after node addition or removal via GUI 60).

Figure 4:
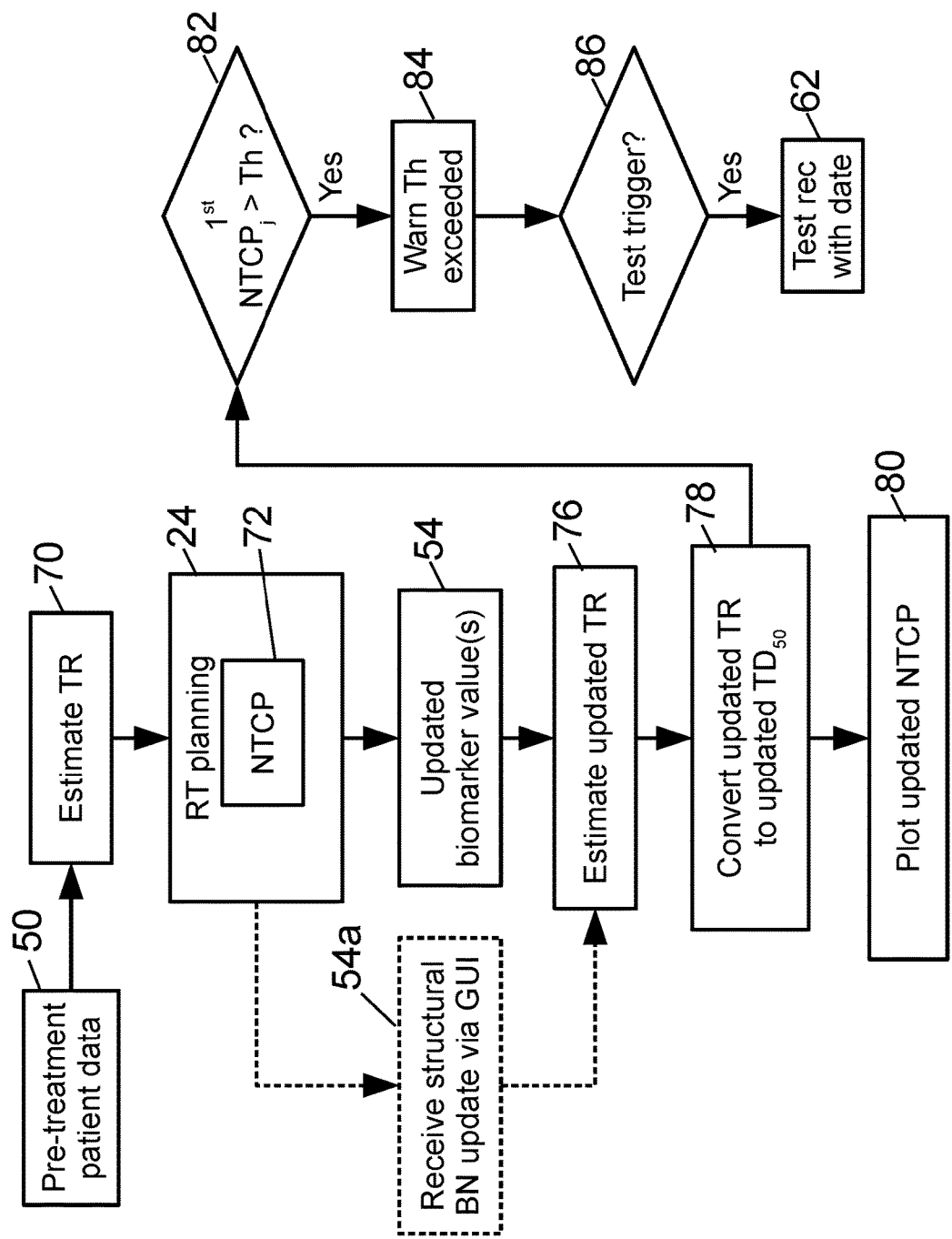
FIG. 4 diagrammatically illustrates a RT support process suitably performed by the apparatus of FIG. 1.

With reference to FIG. 4, an illustrative RT support process including the initial RT planning 24 and a subsequent dynamic risk assessment 52 is described. In an operation 70, the trained Bayesian network toxicity risk model 40 is applied to the pre-treatment patient data 50 to estimate the toxicity risk from which the toxic dose (e.g. $TD_{50}$) is determined. The RT planning 24 is then performed, and for each iteration of the planning the NTCP versus fraction t=1, . . . N 72 is determined using the $TD_{50}$ from operation 70 and the dose $d^t$ for the fraction indexed by t (see Equation (3)-(4) and related text). The iterative RT planning 24 arrives at the RT plan 26 which is executed fraction by fraction using the radiation treatment device 30 (see FIG. 1). Later, during the course of the radiation therapy, one or more updated biomarker values 54 are received, and in an operation 76 the trained Bayesian network toxicity risk model 40 is applied with the updated biomarker value(s) to generate an updated toxicity risk. In an operation 78, the updated toxicity risk is converted to updated NTCP values for the fractions t=1, . . . , N using the NTCP model 22. These updated NTCP values may be plotted as a function of fraction in an operation 80 (see also FIG. 6). At an operation 82 it is determined whether the updated NTCP values exceed a threshold value above which the risk of the RT side effect is deemed unacceptable. If this is the case, then the operation 82 suitably identifies the first fraction at which the NTCP value exceeds this threshold. (Since the total radiation dose increases with each successive fraction, the NTCP as a function of fraction is monotonically increasing in the absence of any adjustment to the toxic dose underlying the NTCP model; hence, every fraction after the first fraction whose NTCP exceeds the threshold will also exceed the threshold). In an operation 84, a warning is displayed on the display 16 via the GUI 60 that the NTCP will become unacceptably high at the identified threshold. In some embodiments, this may be followed by an operation 86 that detects whether the NTCP exceeding the threshold should trigger a probative medical test to assess the risk of the subject RT side effect. In some RT protocols, such a test may be performed just prior to the fraction at which NTCP exceeds the threshold, or at some other time point defined in relation to that fraction. In this regard, the fractions of the RT plan 26 typically have scheduled calendar dates (or date ranges) on which the respective fractions are to be performed. (A "calendar date" as used herein refers to the scheduled date or range of dates for performing the fraction. In some implementations, the calendar date or date range may be specified by the fraction, e.g. the calendar date for an action may be specified as "after fraction 20" indicating the range of calendar dates extending from immediately after performance of fraction 20 to immediately before performance of fraction 21). If such a protocol is being employed, then the previously mentioned test recommendation 62 can be initiated or updated (e.g. displayed via the GUI for the clinician to confirm or modify) based on the calendar date or date range of the first fraction at which the NTCP exceeds the threshold. It may be noted that the operation 86 may initiate the test recommendation (i.e., recommend a test that was not initially part of the scheduled RT regimen) or update the test recommendation (e.g., change the recommended calendar date or date range of a test that was initially part of the scheduled RT regimen).

With continuing reference to FIG. 4, similar processing may occur if a structural update to the Bayesian network toxicity risk model 40 is received at operation 54a shown in FIG. 4. This may correspond, for example, to addition or removal of a node or directed arc (e.g., the removal of node 68 and associated arcs described with reference to FIG. 3). In this case, the toxicity risk may again be re-estimated in operation 76 and the subsequent operations 78, 80, 82, 84, 86, 62 may be performed.

With reference to FIGS. 5-9, in the following some information renderings that may be presented by the GUI 60 in various aspects of the dynamic risk assessment 52 are described as non-limiting illustrative examples.

Figure 5:
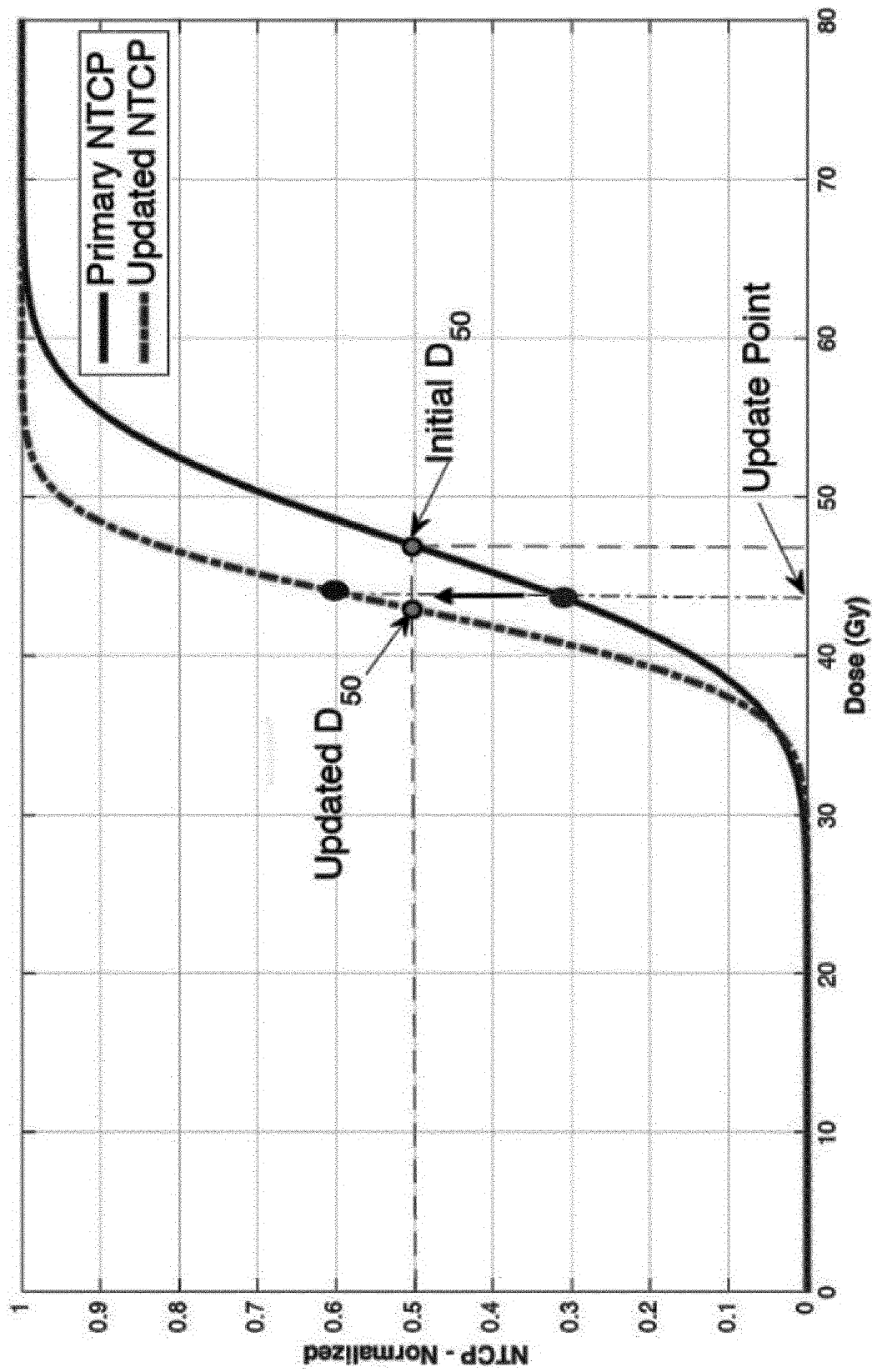

With reference to FIG. 5, an example is shown of a plot shown by the GUI 60 of the NTCP value as a function of dose. The solid plot is the original (i.e. primary) NTCP plot generated at the time of the radiation therapy planning 24, while the dashed plot is the updated NTCP plot generated by the dynamic risk assessment 52 during the fractionated RT plan. The updated NTCP plot is updated by the operations 76, 78 of FIG. 4.

Figure 6:
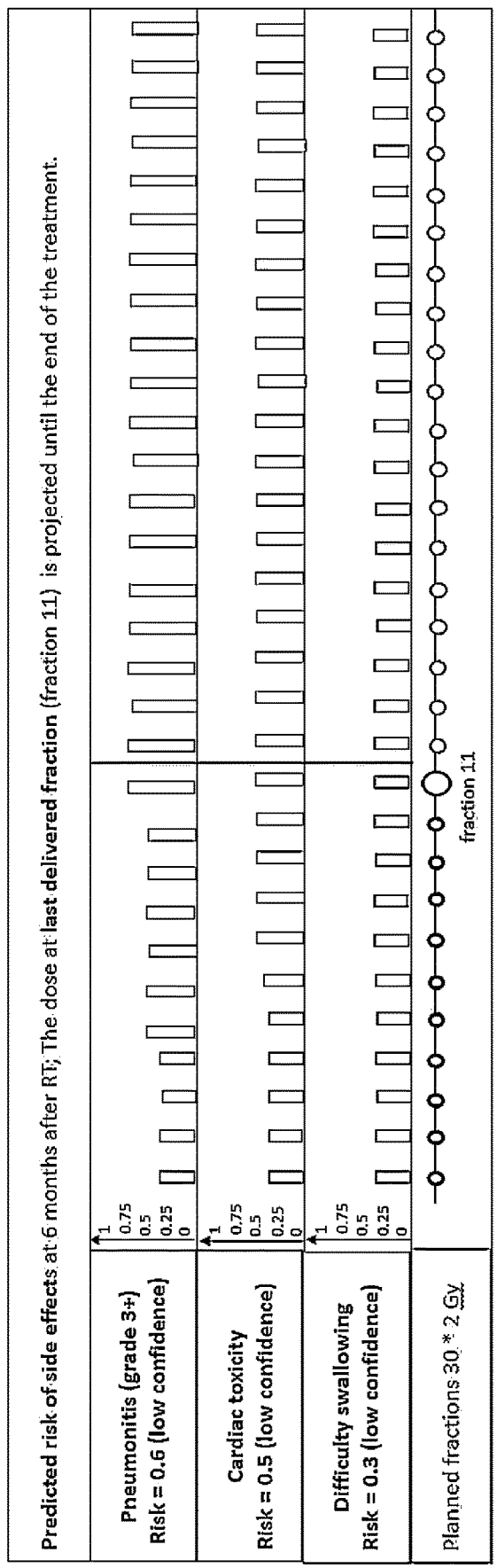
Figure 7:
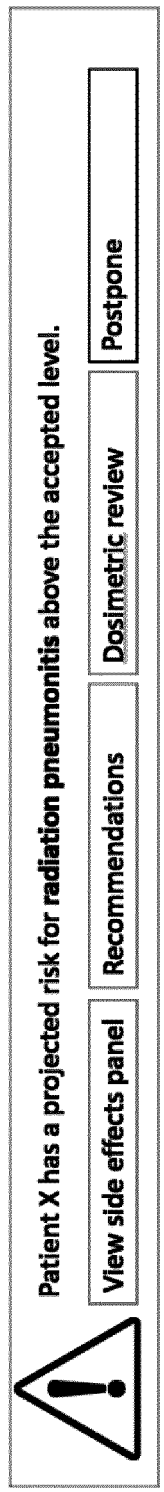

With reference to FIG. 6, an example is shown of plots shown by the GUI 60 of NTCP value as a function of (at least) the remaining fraction(s) of the RT plan 26. This corresponds to operation 80 of FIG. 4, where each bar in FIG. 6 is an NTCP$^t$ value for fraction t. More particularly, FIG. 6 illustrates NTCP$^t$ versus fraction t plots for three different RT side effects: pneumonitis (top plot), cardiac toxicity (middle plot), and difficulty swallowing (lower plot). Although not shown in the monochrome drawing of FIG. 6, it will be appreciated that the NTCP bars may optionally be color coded, e.g. bars representing NTCP values below some "low" threshold (e.g. 0.3) may be shown as green bars, bars representing NTCP values above some "high" threshold (e.g. 0.7) may be shown as red bars, and bars representing NTCP values between the low and high thresholds may be shown as yellow bars. The plot labels at the left of each plot also indicate a confidence assessment. The optional confidence values may be determined from the Bayesian statistics generated by the Bayesian network toxicity risk model 40 or by some other statistical estimate of the reliability of the NTCP values. In general, a low confidence is usually a consequence of a limited amount of data upon which to generate the NTCP, and/or data of low quality (e.g., the underlying data has low confidence). The plots of FIG. 6 enable a quick overview of the projected risk of the side effects. In the example of FIG. 6, the patient has received 11 radiation therapy fractions. The projected risk is calculated on a total delivered dose until the end of the treatment. The risk prediction is based on the accumulated delivered dose up to fraction 11. The rest of the fractions are assumed to be equal to fraction 11 (i.e. fraction 11 is projected until the end of the treatment). The clinician can select a different extrapolation method to estimate the total dose, for example by selecting instead of fraction 11 a different delivered fraction t, t=1, . . . , 10, or alternatively a weighted sum of the delivered dose at selected fractions. In another variant, a combination of alternative extensions of the accumulated dose to the expected total delivered dose can be used to get a confidence interval for the outcome prediction, With reference to FIG. 7, an example is shown of a warning that the projected risk (e.g. NTCP value) of pneumonitis exceeds an acceptable level (i.e., exceeds a threshold). Said another way, FIG. 7 depicts a warning message that the clinician receives when the projected risk for a side effect (here pneumonitis) exceeds an accepted tolerance level. This suitably corresponds to operation 84 of FIG. 4. The illustrative warning does not identify the fraction (j) at which NTCP$^t$ first exceeds the threshold; however, if the warning of FIG. 7 is displayed in conjunction with the NTCP$^t$ versus fraction t plot of FIG. 6 then the clinician can readily ascertain at which fraction the threshold is exceeded.

With reference to FIGS. 8 and 9, the warning respecting a high NTCP value may provide additional information. FIG. 8 shows an example of a display suitably provided by the GUI 60 of actions triggered by an NTCP value of 0.6 (i.e., 60% probability) for the risk of the RT side effect of pneumonitis (grade 3+). The lower table provides an action recommendations list (left column) and corresponding reasons (right column). The first listed action recommendation is "Acquire FDG-PET scan after fraction 20" with the corresponding reason being "Update value of risk for pneumonitis and increase confidence of prediction". This recommendation may be triggered by the NTCP value rising above an unacceptable risk threshold at some fraction t. (That is, the apparatus of FIG. 1 includes a data structure storing the thresholds and also action recommendations associated with exceeding certain thresholds). The FDG-PET scan is acquired for the lung region within-treatment (e.g. mid-treatment) and the standard uptake value (SUV) in the lung region is then calculated and serves as a biomarker. The calendar date or date range of the recommendation (namely "after fraction 20" in this example) is determined from the fraction at which the NTCP rises above the unacceptable risk threshold. (Note, however, that the calendar date or date range of the recommendation is not necessarily the calendar date of that fraction—for example, if NTCP exceeds the threshold at fraction 23 it may make sense to recommend the FDG-PET after earlier fraction 20 so as to provide increased accuracy and confidence in the prediction prior to reaching the fraction 23 at which the risk is predicted to become unacceptable). FIG. 9 provides more detailed information pertaining to the first action recommendation (namely the recommendation "Acquire FDG-PET scan after fraction 20"). While in this example the trigger for the test recommendation is the NTCP for a fraction exceeding a threshold, other types of triggers are contemplated, such as based on dose volume parameters. Optionally, the GUI 60 may provide the clinician (or a system administrator, or other user) with options for configuring the type and the value of the triggers.

In the following, some further aspects are described, along with some further comments on the non-limiting illustrative examples.

The system of FIG. 1 supports the clinician in detecting the risk for complications based on patient-specific measurements performed before and during the course of the radiotherapy treatment. The system informs the user on the type of additional measurements and on the moment in time (e.g. calendar date or date range) at which the additional measurements are recommended to be performed in order to update the probability (NTCP) to develop a side effect. The system supports the clinician to update the RT-specific risk-prediction model 38 for plan optimization using patient-specific data acquired at a moment in time during the course of treatment and a dynamic risk-prediction model. Based on the updated RT-specific risk-prediction model 38, the clinician can update the initial radiation therapy plan and/or decide the next steps of the cancer care. The GUI 60 enables the clinician to understand the causal relationship between patient-specific measurements acquired at several points in time. The user can interact with the GUI 60 via the user input device(s) 18, 20 at point in time during the course of the treatment and understand which data is the most relevant for decision making at a specific point in time.

The pretreatment risk prediction model 38 with built-in confidence intervals for the uncertainty due to within treatment changes is used to generate a library of treatment plans (from which the RT plan 26 is ultimately selected). Using the within-treatment measurements analyzed via the dynamic risk assessment 52, the system updates the parameters of the prediction models for the various RT side effects and the width of the corresponding confidence intervals. The dynamic risk assessment 52 allows the user to update and compare the initial treatment plans with the treatment plans based on the updated within-treatment parameters. The comparison supports decisions-making for the next steps in cancer treatment: such as, continue with the initial plan, use a different plan from the library, stop the RT treatment, or modify other treatment component (such as e.g., chemotherapy, immunotherapy). Based on the available measurements and on the predicted causal relationships between the measurements, the system of FIG. 1 informs the clinician via test recommendation 62 on the type of additional measurements and on the moment in time at which the additional measurements are required in order to update the probability to develop a side effect. In the illustrative examples of FIGS. 6-9, the system of FIG. 1 is described as predicting radiation pneumonitis for thoracic patients treated with radiation therapy based on pre-treatment and within-treatment features among which a within-treatment (e.g., mid-treatment) measurement of the standard uptake value (SUV) in the lung region in an FDG-PET image.

In a variant embodiment, based on literature data or institute-specific data, the system of FIG. 1 may optionally suggest alternatives to biomarkers to be used for training or retraining the dynamic model. The alterative biomarkers have prior validated correlations to biomarkers used to train the model. This strategy can be useful for the case in which the current RT side effects model 38 is initially trained using biomarkers that the current institute does not have the equipment and/or expertise to measure, or when considerations have to be made to choose the most cost-efficient adaptive strategy, by selecting between alternative biomarkers. To implement this approach, several different Bayesian network toxicity risk models 40 are trained, corresponding to different radiation therapy treatment and/or biomarker monitoring modalities in various combinations with a variety of other cancer treatment modalities, and are updated for a specific patient based on within treatment parameters. The system allows the user to compare the risk predicted for various radiation therapy treatment modalities and to select an alternative radiation therapy modality, for example using GUI renderings such as those of FIG. 3 showing the alternative Bayesian network toxicity risk models 40. The system of FIG. 1 optionally shows statistics on the models such as confidence on the different data inter-relationships, deviation between literature and institution data, and trends over time.

In some specific non-limiting illustrative embodiments, the NTCP-LKB model of Equations (1)-(3) is employed (more generally, any other parametric NTCP model can be used). The trained Bayesian network toxicity risk model 40 is updated with within-treatment acquired patient-measurements. The toxicity risk output of the dynamic Bayesian network toxicity risk model 40 is the estimate for the toxicity endpoint for the RT side effect of interest (e.g., radiation pneumonitis, xerostomia, etc.). This output value can be interpreted as the output of an (updated) NTCP model 22 at time T (denoted by $NTCP^T$) value for the organ at risk. For the LKB-NTCP example, assuming a fixed value for m, and knowing the dose delivered up until this point ($EUD^T$), the updated value for a parameter of the NTCP model $TD_{50}^{T+1}$ (i.e. toxic dose) can be computed as follows:

$$TD_{50}^{T+1} = \frac{EUD^T}{\left(1 + m\Phi^{-1}(NTCP^T)\right)} \text{ where} \qquad (5)$$

$$\Phi(x) = \frac{1}{\sqrt{2\pi}} \int_{-\infty}^{x} e^{-t^2/2} dt, \text{ and } \Phi^{-1}(x)$$

is its inverse. Using this value of the toxic dose parameter, an updated NTCP model for the individual patient can be obtained using within treatment-acquired data. FIG. 5 is an illustrative example of the update of the NTCP model based on the updated parameter value plotted graphically.

The various illustrative GUI displays of FIGS. 2, 3, and 5-9 may be variously navigated via the GUI 60. In one contemplated navigation sequence, from the side effects panel depicted in FIG. 6, the clinician has access to GUIs that enable a detailed understanding of patient data that is predictive of a selected side effect. For example, by clicking on "pneumonitis" in the display of FIG. 6, the clinician thereby accesses the display of FIG. 8, where the clinician can inspect the data predictive of a risk for pneumonitis. In other contemplated navigational approaches, by selecting two or more side effects, the clinician can inspect the data common to all side effects (intersection of data) and the data related to all side effects (union of data predictive of selected side effects). The data common to all side effects could be shown in a color, font, size (etc.) different from the color of the data union—data intersection.

The invention has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. An apparatus for supporting delivery of radiation therapy (RT) to a patient, the apparatus comprising:
an electronic processor; and
a non-transitory storage medium storing instructions readable and executable by the electronic processor to perform a RT support method including:
estimating a patient-specific toxicity risk for a RT side effect using a Bayesian network that receives as inputs values of biomarkers of the patient;
receiving at least one updated value for the biomarkers of the patient;
estimating an updated patient-specific toxicity risk using the Bayesian network receiving as input the at least one updated value;
generating or receiving a patient-specific RT plan that is optimized with respect to parameters including the patient-specific toxicity risk;
converting the updated patient-specific toxicity risk to an updated normal tissue complication probability (NTCP) value for the patient-specific RT plan using an NTCP model dependent upon the patient-specific toxicity risk; and
displaying, on a display operatively connected with the electronic processor, at least one of the updated NTCP value and a warning when the updated NTCP value exceeds a threshold.

2. The apparatus of claim 1 wherein the patient-specific RT plan is a fractionated RT plan, the updated patient-specific toxicity risk is converted to an updated NTCP value for at least remaining fractions of the fractionated RT plan that have not yet been performed at a time of the receiving of the at least one updated value, and the displaying includes displaying at least one of a plot of the updated NTCP values as a function of at least the remaining fractions of the fractionated RT plan and a warning for a first remaining fraction of the remaining fractions whose updated NTCP value exceeds the threshold.

3. The apparatus of claim 1 wherein the RT support method further includes:
displaying, on the display operatively connected with the electronic processor, a graphical user interface (GUI) including a rendering of the Bayesian network.

4. The apparatus of claim 3 wherein the RT support method further includes:
receiving, via a user input device interacting with the GUI, one or more structural modifications of the Bayesian network selected from the group consisting of:
addition of a node of the Bayesian network, removal of a node of the Bayesian network, addition of a directed arc to the Bayesian network, and removal of a directed arc from the Bayesian network; and
estimating a user-updated patient-specific toxicity risk using the Bayesian network with the received one or more structural modifications.

5. The apparatus of claim 4 wherein the RT support method further includes:
generating or receiving a patient-specific RT plan that is optimized with respect to parameters including the patient-specific toxicity risk;
converting the user-updated patient-specific toxicity risk to a user-updated normal tissue complication probability (NTCP) value for the patient-specific RT plan using an NTCP model dependent upon the patient-specific toxicity risk; and
displaying, on the display operatively connected with the electronic processor, at least one of the user-updated NTCP value and a warning if the user-updated NTCP value exceeds a threshold.

6. The apparatus of claim 1 wherein the RT support method further includes initiating or updating a test recommendation for scheduling of a patient test based on the updated patient-specific toxicity risk.

7. The apparatus of claim 6 wherein the patient-specific RT plan is a fractionated RT plan, and the initiating or updating of the test recommendation for scheduling of the patient test includes:
generating or receiving a patient-specific RT plan which is optimized with respect to parameters including the patient-specific toxicity risk;
converting the updated patient-specific toxicity risk to updated normal tissue complication probability (NTCP) values for at least remaining fractions of the fractionated RT plan that have not yet been performed at a time of the receiving of the at least one updated value; and
recommending a calendar date or calendar date range for the patient test based on the updated NTCP values for the remaining fractions of the fractionated RT plan and scheduled calendar dates or date ranges for the remaining fractions of the fractionated RT plan.

8. The apparatus of claim 6 wherein:
the patient-specific toxicity risk is a pneumonitis risk and the test recommendation comprises a fludeoxyglucose positron emission tomography (FDG-PET) scan recommendation.

9. The apparatus of claim 1 wherein the Bayesian network has nodes including biomarker nodes including corresponding values of the biomarkers of the patient and a toxicity risk node including a patient-specific toxicity risk, the Bayesian network further including directed arcs wherein each directed arc connects a first node consisting of a biomarker node to a second node consisting of a biomarker node or the toxicity risk node, the directed arcs having arc weights including strengths of interdependencies between the nodes connected by the directed arcs.

10. The apparatus of claim 9 wherein the biomarker nodes of the Bayesian network include at least three of:
a biomarker node including a value of at least one biomarker of the patient retrieved from a patient clinical history of the patient;
a biomarker node including a value of at least one imaging biomarker of the patient acquired by medical imaging of the patient;
a biomarker node including a value of at least one blood biomarker of the patient acquired by testing of blood of the patient; and
a biomarker node including a value of at least one genomic biomarker of the patient acquired by genomic testing of the patient.

11. The apparatus of claim 1 wherein the patient-specific toxicity risk is a pneumonitis risk and the Bayesian network includes biomarker nodes that include:
a biomarker node including a standard uptake value (SUV) in a lung region acquired by positron emission tomography (PET).

12. The apparatus of claim 1 wherein the patient-specific toxicity risk is converted to a patient-specific median toxic dose ($TD_{50}$).

13. A non-transitory storage medium storing instructions readable and executable by an electronic processor to perform a radiation therapy (RT) support method for supporting delivery of RT to a patient in accordance with a fractionated RT plan, the RT support method comprising:
  estimating an initial patient-specific toxicity risk for a RT side effect using a Bayesian network having nodes including biomarkers of the patient and the patient-specific toxicity risk and further having directed arcs extending between pairs of the nodes wherein the directed arcs have arc weights;
  converting the initial patient-specific toxicity risk to initial normal tissue complication probability (NTCP) values for fractions of the fractionated RT plan using a NTCP model;
  receiving at least one updated value of at least one of the biomarkers of the patient included in the nodes of the Bayesian network;
  estimating an updated patient-specific toxicity risk using the Bayesian network with the at least one updated value; and
  converting, using a NTCP model dependent upon the patient-specific toxicity risk, the updated patient-specific toxicity risk to updated NTCP values for at least fractions of the fractionated RT plan that have not yet been performed at a time of the receiving of the at least one updated value, wherein the RT support method further includes displaying, on a display operatively connected with the electronic processor, at least one of the updated NTCP value and a warning if the updated NTCP value exceeds a threshold.

14. The non-transitory storage medium of claim 13 wherein the RT support method further comprises:
  displaying, on the display operatively connected with the electronic processor, a plot of the updated NTCP values as a function of at least remaining fractions of the fractionated RT plan.

15. The non-transitory storage medium of claim 13 wherein the RT support method further includes:
  displaying, on the display operatively connected with the electronic processor, a test recommendation based on the updated NTCP values to perform a patient test including a recommended calendar date or date range for performing the patient test.

16. The non-transitory storage medium of claim 13 wherein the RT support method further includes:
  displaying, on the display operatively connected with the electronic processor, a graphical user interface (GUD including a rendering of interrelationships of the biomarkers of the patient and the patient-specific toxicity risk generated using the Bayesian network.

17. The non-transitory storage medium of claim 16 wherein the RT support method further includes:
  receiving, via a user input device interacting with the GUI, one or more structural modifications of the Bayesian network;
  estimating a user-updated patient-specific toxicity risk using the Bayesian network with the received one or more structural modifications; and
  converting the user-updated patient-specific toxicity risk to user-updated NTCP values for at least the fractions of the fractionated RT plan that have not yet been performed at a time of the receiving of the one or more structural modifications of the Bayesian network.

18. The non-transitory storage medium of claim 13 wherein the nodes of the Bayesian network include nodes including:
  imaging biomarkers of the patient acquired by medical imaging of the patient;
  blood biomarkers of the patient acquired by testing of blood of the patient; and
  genomic biomarkers of the patient acquired by genomic testing of the patient.

19. A radiation therapy (RT) support method for supporting delivery of RT to a patient in accordance with a patient-specific RT plan, the RT support method comprising:
  by an electronic processor, estimating a patient-specific toxicity risk for a RT side effect using a Bayesian network that receives as inputs values of biomarkers of the patient;
  receiving at least one updated value for the biomarkers of the patient;
  estimating an updated patient-specific toxicity risk using the Bayesian network receiving as input the at least one updated value; the method further comprising:
  converting the updated patient-specific toxicity risk to an updated normal tissue complication probability (NTCP) value for the patient-specific RT plan using an NTCP model dependent upon the patient-specific toxicity risk; and
  displaying, on a display operatively connected with the electronic processor, at least one of the updated NTCP value and a warning if the updated NTCP value exceeds a threshold.

20. The RT support method of claim 19 wherein the Bayesian network has nodes including biomarker nodes including values of biomarkers of the patient and a toxicity risk node representing the patient-specific toxicity risk, the Bayesian network further including directed arcs wherein each directed arc connects a first node consisting of a biomarker node to a second node consisting of a biomarker node or the toxicity risk node, each directed arc having an arc weight including a strength of interdependence of the second node on the first node.

21. The RT support method of claim 19 further comprising:
  receiving, via a user input device, one or more structural modifications of the Bayesian network; and
  re-estimating the patient-specific toxicity risk using the Bayesian network with the received one or more structural modifications.

* * * * *